Oct. 21, 1952  R. W. ARENGO-JONES  2,614,593
SEED CELLING MACHINE

Filed Aug. 1, 1945  4 Sheets-Sheet 1

FIG_1

FIG_7

FIG_12

Inventor
RHYS W. ARENGO-JONES.

By Philip A. Minnis
Attorney

Oct. 21, 1952     R. W. ARENGO-JONES     2,614,593
SEED CELLING MACHINE

Filed Aug. 1, 1945     4 Sheets-Sheet 3

Inventor
RHYS W. ARENGO-JONES.
By Philip A. Minnis
Attorney

Oct. 21, 1952  R. W. ARENGO-JONES  2,614,593
SEED CELLING MACHINE
Filed Aug. 1, 1945  4 Sheets-Sheet 4

Inventor
RHYS W. ARENGO-JONES.
By Philip A. Minnis.
Attorney

Patented Oct. 21, 1952

2,614,593

UNITED STATES PATENT OFFICE 2,614,593

SEED CELLING MACHINE

Rhys W. Arengo-Jones, Toronto, Ontario, Canada, assignor to Food Machinery and Chemical Corporation, a corporation of Delaware Application August 1, 1945, Serial No. 608,119½

1 Claim. (Cl. 146—17)

The present invention relates to a machine for halving and seed celling fruit such as apples and for subsequently dividing the halved and seed celled fruit into segments.

An object of the present invention is to provide improved facilities for removing the seed cells of halved fruit such as apples or the like.

Another object of the present invention is to provide an improved simple and efficient machine for halving and seed celling fruit such as apples.

Another object of the invention is to provide an improved machine in which a seed cell cutter is employed and operated in timed relation with a fruit holder in such a manner that the cutter is moved into seed cell cutting position with the fruit supported by the holder when the fruit is moved past the cutter.

Another object of the invention is to provide an improved machine of the above character in which the movement of the seed cell cutter into cutting position is controlled by the fruit holder during its movement toward the seed cell cutting position.

Another object of the invention is to provide an improved seed cell removing machine provided with a bodily rotating seed cell removing knife normally disposed in an inoperative position and adapted to be moved into operative position to remove the seed cell from the fruit when a half fruit is moved past the same.

Another object of the present invention is to provide an improved seed celling machine having a constantly rotating turret provided with a plurality of fruit holders by which halves of fruit are positioned with their seed cells exposed to receive a seed cell knife movable into and out of seed cell removing position with respect to the fruit during travel of the holders past the same.

Another object of the present invention is to provide an improved machine by which cored and pared whole apples are halved, have their seed cells removed.

Another object of the present invention is to provide an improved seed celling machine having means for gauging the depth of cut of the seed cell removing knife in accordance to the size of the fruit.

Additional objects of the invention will more readily appear from the following description of a preferred embodiment, as illustrated in the accompanying drawings, in which:

The machine shown in the present application has been especially designed to be used with apples that are peeled and have the core cut out so that there is a core hole through the axis of each apple. With the machine of the present invention the cored and peeled apples are first halved, the seed cell is then cut out of each half, and finally the halves are cut into segments. As will be hereinafter more fully described the machine is constructed so that the seed celling operation is simultaneously performed on each half of an apple by coordinated mechanisms as the halves move through the machine in diverging paths.

Figures 1, 7, 12:
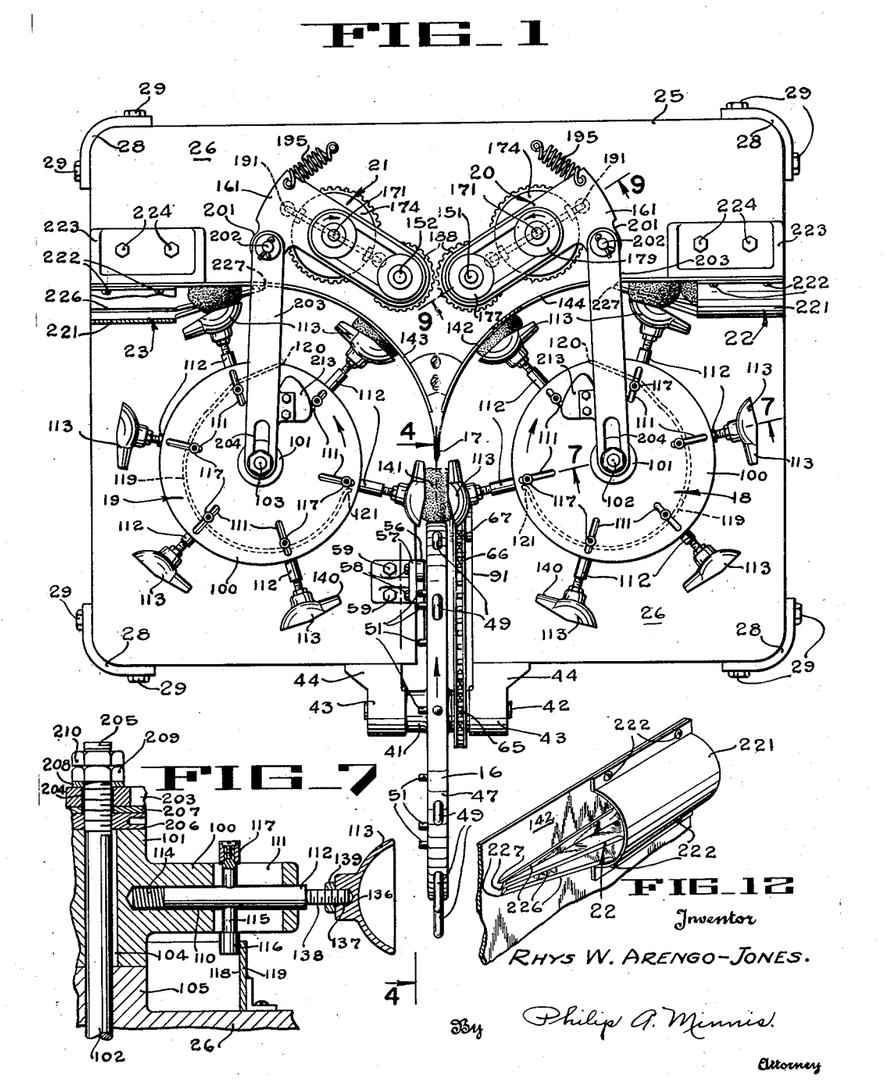
Fig. 1 is a plan view of a machine constructed according to the present invention, parts being broken away to show the underlying structure.
Fig. 7 is a vertical section taken along line 7—7 of Fig. 1.
Fig. 12 is an enlarged perspective view of one of the segmenting knives and the portion of the machine on which the knife is mounted.

Referring to the drawings and especially to Fig. 1, the improved fruit halving and seed celling machine comprises a feed conveyor or turret generally indicated at 16, a halving knife 17, a pair of fruit holding conveyors or turrets generally indicated at 18, 19, respectively, for receiving and holding the halves of fruit during the seed celling operation, a pair of seed celling mechanisms generally indicated at 20, 21 which are operatively associated with the turrets or fruit holding conveyors 18, 19, respectively, and a pair of segment cutters generally indicated at 22, 23. The above elements, together with suitable operating mechanism therefor, are mounted on a supporting structure or frame generally indicated at 25.

The frame 25 of the machine comprises a top 26, which may be substantially rectangular in form, as shown in Fig. 1. Depending from the top 26 and extending around the four sides thereof is a flange or skirt 27. Legs 28 are secured to the skirt 27, at the four corners of the top 26, by means of bolts 29, or other suitable securing elements, Fig. 1, 2 and 3. The legs 28 support the top 26 a suitable distance above the floor, and disposed beneath the top in suitable spaced relation thereto and supported from the legs 28, are angles 30, which are arranged lengthwise of the frame of the machine. Supported by the angles 30 and extending transversely of the frame are motor supporting angles 31, Figs. 2 and 3. Also disposed in spaced relation beneath the top 26 and located at suitable distance above the angles 30 and 31, is a plate 32. The plate 32 is substantially rectangular in form, being approximately one-half the width of the top 26 and approximately the same length as the top, as shown in Fig. 3. The plate 32 supports the operating mechanism of the machine to be hereinafter described. At intervals around three sides of the skirt 27, ears 33 are provided. The plate 32 is secured to the frame by suitable securing elements 34 carried by the ears 33, Fig. 3.

Figures 2, 5, 6, 11:
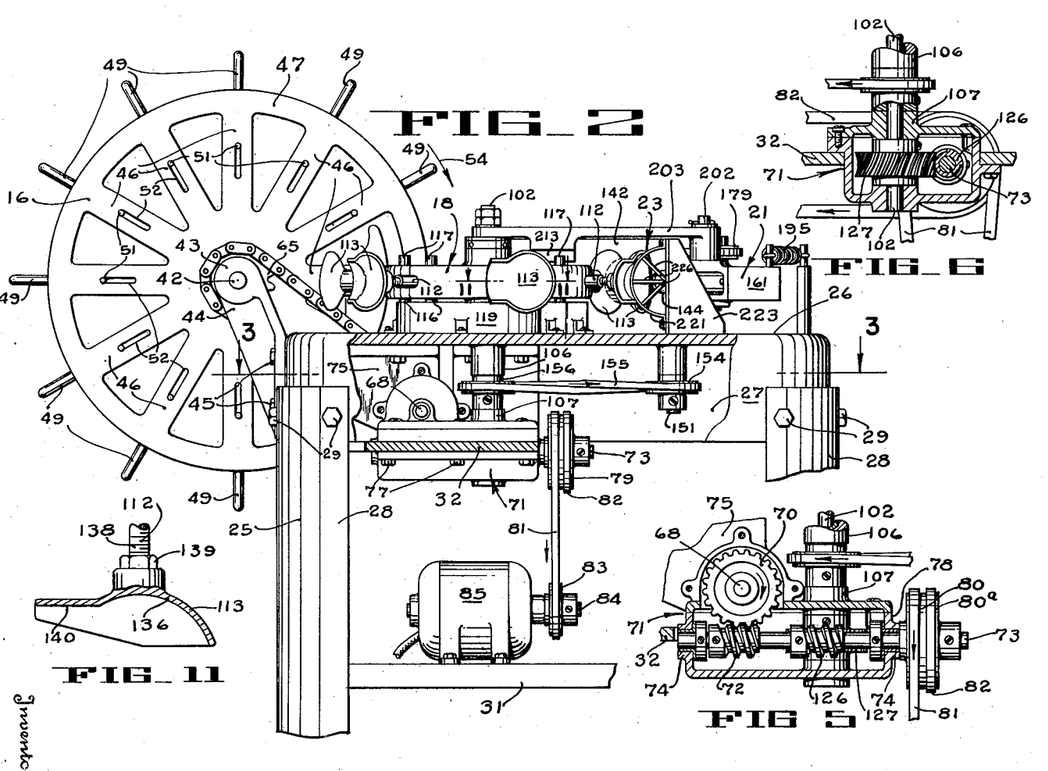
Fig. 2 is a side elevation of the machine shown in Fig. 1, parts being broken away, and other parts being in section.
Fig. 5 is a vertical section taken along line 5—5 of Fig. 3.
Fig. 6 is a vertical section taken along line 6—6 of Fig. 3.
Fig. 11 is an enlarged section taken along the line 11—11 of Fig. 2.
Figure 3:
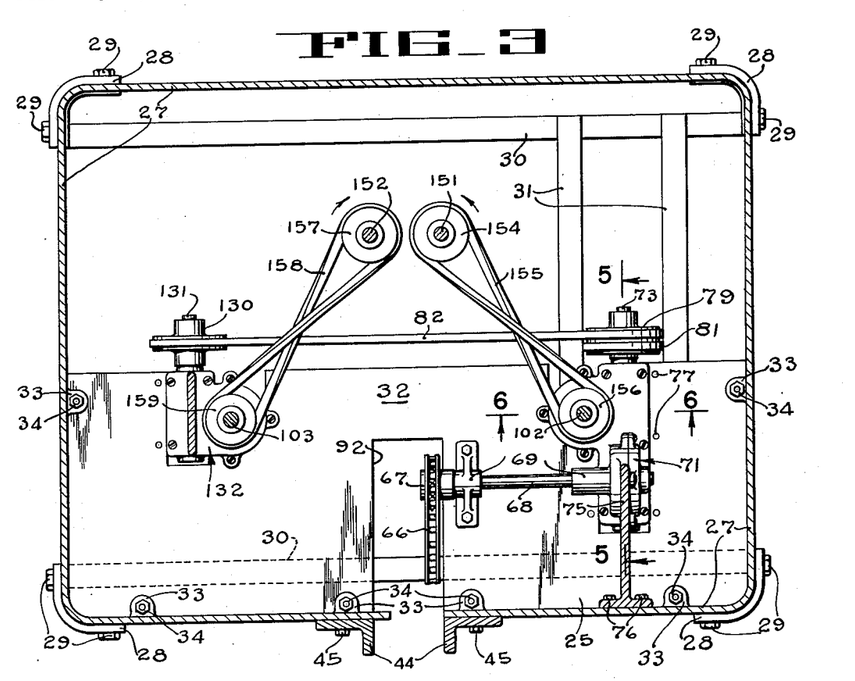
Fig. 3 is a horizontal section taken along line 3—3 of Fig. 2.
Figure 4:
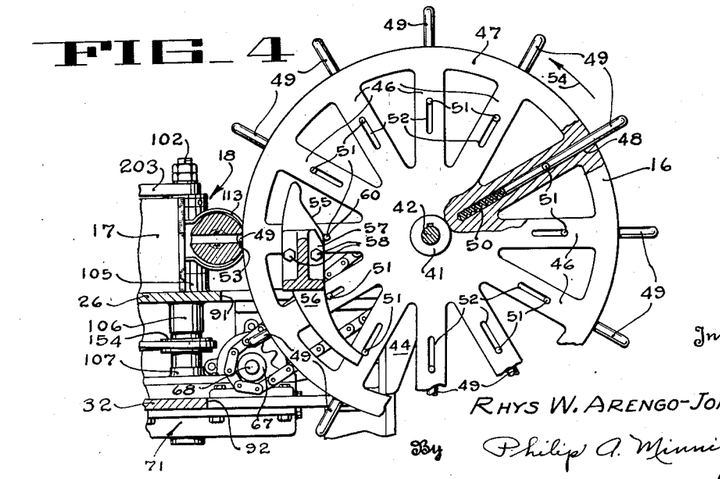
Fig. 4 is a vertical section taken along line 4—4 of Fig. 1, parts being shown in side elevation.

As shown in Figs. 1, 2 and 4, the feed turret 16 is in the form of a wheel having a hub 41 fixed to a shaft 42 rotatably mounted in bearings 43 carried by brackets 44 fixed to the frame of the machine, as indicated at 45. Radiating from the hub 41 are spokes or arms 46, on the extremities of which a circular rim or band 47 is formed. If desired the hub 41, spokes or arms 46, and the circular rim or band 47 can be made in the form of a one piece casting.

Each spoke or arm 46 is formed with a bore 48 which extends lengthwise thereof and passes through the rim 47. Slidably mounted within each bore 48 is a rod 49 which projects outwardly a suitable distance beyond the periphery of the turret to provide a prong for supporting an apple. The inner end of each rod 49 is spaced from the inner end of the bore 48, and mounted in such space is a compression spring 50 which bears at one end against the inner end of the rod 49 and bears at the other end against the inner end of the bore 48 so as to normally maintain the rod 49 in an extended position with respect to the turret.

Each rod 49 is retained within the bore 48 by a pin 51 which extends diametrically through the rod, the two projecting ends of said pin being disposed in elongated slots 52 formed in the spoke or arm 46. One end of the pin 51 extends outwardly beyond the side face of the turret as shown in Fig. 1.

The spring 50 normally urges the rod 49 outwardly with respect to the rim or band 47, such outward movement being limited by the pin 51 abutting the outer ends of the slots 52. On the other hand the slots 52 have a length sufficient to permit the rod 49 to move inwardly of the arm 46 until only the tip of the rod 49 is exposed, as indicated at 53, Fig. 4, when the pin 51 engages the inner ends of the slots 52.

Since the apple has been previously peeled and has a core opening therein somewhat larger in diameter than the diameter of the rod 49, the apple will fit loosely on the rod and rest against the peripheral surface of the rim 47 of the turret 16, during rotation of the turret in the direction of arrow 54, Figs. 2 and 4.

In the present machine the feed turret 16 is adapted to rotate continuously, however, if desired the same may be rotated intermittently by appropriate mechanism, for instance by a Geneva drive, well known in the art. As the turret rotates, each pin 51 engages the inner surface 55 of a cam 56 fastened to the upstanding face of a bracket 57 by bolts 58, Fig. 4. The bracket 57 is bolted to the top 26 of the frame, as indicated at 59, Fig. 1. The cam surface 55 is adapted to cause the pin 51 to traverse the slots 52 from the outer ends of said slots to the inner ends of said slots, as indicated at 60, Fig. 4, whereby the rod 49 is gradually moved inwardly of the bore 48 so that the portion of the rod which projects outwardly beyond the periphery of the turret and on which the apple is mounted is withdrawn from the core of the apple by the time the rod 49 attains a substantially horizontal position, Fig. 4. In this way an apple is released from the feed turret.

Turret shaft 42 has fixed thereon for rotation therewith a sprocket 65 which is connected by a chain 66 to a sprocket 67 keyed to a shaft 68 journaled in suitable bearings 69 as shown in Fig. 3. Fixedly secured to the shaft 68 is a worm gear 70 of a speed reducer 71 (Fig. 5). The worm gear 70 meshes with a worm 72 mounted on a shaft 73 journaled in bearings 74 carried by the housing of the speed reducer 71. The speed reducer is provided with a bracket 75 which is fastened to the frame by bolts 76, Fig. 3. The speed reducer 71 is also fastened to the plate 32 of the frame, as indicated at 77, Fig. 2. The housing of the speed reducer 71 is formed of detachable sections, as shown in Figs. 2, 5 and 6, whereby access may be readily had to the interior of the speed reducer.

Shaft 73 extends outwardly through the wall 78 of the housing of the speed reducer 71. Secured to the extended portion of the shaft 73 is a pulley 79 having double grooves 80 and 80ª which are arranged to receive two endless V-belts 81 and 82, respectively. In lieu of the single double grooved pulley, two pulleys may be employed if desired, each pulley having a groove for receiving a V-belt or other suitable power transmitting means. In either case the pulley or pulleys are fixedly connected to the shaft 73. V-belt 81 passes around a pulley 83 on the shaft 84 of an electric motor 85 mounted on the angles 31 of the frame in the manner shown best in Fig. 2.

As shown in Fig. 1, the halving knife 17 has a vertical cutting edge disposed in spaced relation to the side of the frame 25 on which the brackets 44 are mounted, and in order to accommodate the feed turret 16 and provide a clearance space for the rods 49 and the pins 51, the top 26 of the frame is formed with a cut-out portion 91 (see also Fig. 4). The plate 32 is also provided with a similar cut-out portion 92 which is arranged in vertical alignment with the cut-out portion 91. The drive chain 66 for the feed turret 16 passes through both cut-out portions 91, 92.

The conveyors or turrets 18, 19 for holding the halves of fruit during the seed celling operation are similar in construction and a detail description of one will suffice for both.

Each holding turret 18, 19 comprises an annular disc-like body or member 100 having a hub 101 bored to receive a vertical shaft. The shaft of turret 18 is indicated at 102, and the shaft of turret 19 is indicated at 103. The shafts are keyed to the hub of each turret respectively, as indicated at 104, Fig. 7. The shaft 102 is rotatably mounted in bearings provided by bosses 105 and 106 formed on the top 26 of the frame and by boss 107 formed on the housing of the speed reducer 71, Figs. 2 and 4. The bearing provided by boss 105 constitutes a thrust bearing for supporting the turret.

Formed radially in the member 100 are a plurality of horizontally disposed bores 110 which extend inwardly a suitable distance from the periphery of the member 100. Intersecting each horizontal bore 110 is an elongated slot 111 which is formed vertically through the member 100 in the manner shown best in Fig. 7. The slot 111 has a length somewhat less than the length of the bore 110.

Slidably mounted in each horizontal bore 110 is a cup supporting rod 112 having a fruit holder cup 113 detachably mounted on its outer end. The inner end of each rod 112 is spaced from the inner end of the bore 110 and mounted in such space is a compression spring 114 which bears at one end against the inner end of the rod 112 and bears at the other end against the inner end of the bore 110 so as to normally urge the rod outwardly with respect to the turret.

Each rod 112 is retained in position with respect to the member 100 by a pin 115 which extends diametrically through the rod and is disposed within the upper and lower portions of the slot 111. Each end of the pin 115 projects beyond the upper and lower surfaces of the member 100 a suitable distance. The lower end of the pin 115 has a roller 116 mounted thereon and the upper end of the pin has a roller 117 mounted thereon (Fig. 7). During rotation of the turret the roller 116 is adapted to engage a cam surface 118 of a cam 119 fixed to the top 26 of the frame of the machine and upstanding therefrom, as shown best in Fig. 7. When the roller 116 is out of engagement with the cam surface 118, the spring 114 maintains the cup 113 in fully extended position. The contour of the cam surface 118 is such that when the roller 116 engages the end 120 of the cam, Fig. 1, the rod 112 and the cup 113 thereon are retracted quickly a predetermined distance thereby compressing the spring 114. The cup is retained in such retracted position during further rotation of the turret and is then gradually permitted by the cam to move outwardly and at the end 121 of the cam the cup again attains an extended position for a purpose to be hereinafter described.

As shown in Fig. 5, shaft 102 of the turret 18 is driven from a worm 126 on shaft 73 of the speed reducer 71 which is in meshing relationship with a worm gear 127 fixed to the lower end of shaft 102, as shown in Fig. 6. For the purpose of rotating the turret 19 in a direction opposite to the direction in which the turret 18 is rotated, V-belt 82 connects pulley 79 with a pulley 130 fixedly mounted on a shaft 131 of a speed reducer 132, Fig. 3. The speed reducer 132 is similar in construction to the speed reducer 71 with the exception that the speed reducer 71 also includes the shaft 68, worm gear 70 and worm 72. Shaft 131 has a worm which meshes with a worm gear fixed to the lower end of shaft 103 of the turret 19, in the manner shown in Fig. 6. In this way the two turrets 18, 19 are constantly rotated in opposite directions and at a uniform speed from power supplied by motor 85.

The cups 113 may be constructed of any suitable material such as metal, plastic composition material, rubber, or the like. Each cup 113 (Fig. 11) has a semi-spherical surface 136 which provides a pocket which conforms approximately to the shape of the half of an apple. The contour of the surface 136 obviously may not provide a perfect fit for all apples, it being understood that the contour of the surface 136 is such that the cup is adapted to handle apples of various shapes and sizes through a considerable range. Since the apples used for processing do not generally include extremely large apples, in normal operation of the machine one size of cup 113 can be used. However, when it is desired to process apples having sizes outside of the range of one set of cups, other sizes of cups may be substituted for the same. Therefore, each cup 113 is provided with a boss having an internally threaded opening 137 (Fig. 7) by which the cup is fixedly mounted on the threaded end 138 of the rod 112, the cup being retained in adjusted position on said rod by means of a lock nut 139.

The forward wall of each cup 113 may be formed with a forwardly extending channel 140 (Fig. 11) which prevents engagement of the cup with an apple as the cup is rotated by the turret into position to receive the apple (Fig. 1). The cups 113 may also be formed with yieldable lip portions to avoid any damaging contact with the fruit during engagement and disengagement of the cups with the fruit. In such case the lips can be made, if desired, of soft rubber. It may also be found desirable to form the entire body of the cups of some slightly resilient grade of rubber.

As shown in Fig. 1, the fruit holders or cups 113 are so carried by the turrets 18, 19 that during rotation of the turrets in opposite directions in a horizontal plane, a pair of opposed cups will contact an apple 141 and securely grip the apple when the apple is being released from the prong 49. The two cups then carry the apple forwardly in a direction away from the periphery of the feed turret 16 and press the apple against the cutting edge of the stationary knife 17 so that the knife cuts the apple into halves.

Forming a continuation of the knife and extending rearwardly from each side of the knife in an arc substantially concentric with the axis of rotation of the turret shafts 102 and 103, are guide plates 142 and 143, the guide plate 142 partly encircling the turret 18 and being arranged in spaced relation to the cups 113 of said turret, and the guide plate 143 being correspondingly disposed with respect to the cups 113 of the turret 19. As the apple is cut in two each half is pressed with its exposed seed cell side against its respective plate by the spring 114. The plates 142, 143 thus function as means for retaining the halves of an apple in the cups 113 so that the cut surface of each half is disposed in position to have the seed cells removed therefrom by the seed celling mechanism. Each plate 142, 143 has an elongated opening 144 formed therein for a purpose to be hereinafter described.

The seed celling mechanisms 20, 21 are identical in construction and operation, the mechanism 20 being mounted on a shaft 151 for swinging movement toward and away from the halves of apples carried by the cups 113 of the turret 18, and the mechanism 21 being mounted on a shaft 152 for swinging movement toward and away from the halves of apples carried by the cups of the turret 19.

Figures 8, 9, 10:
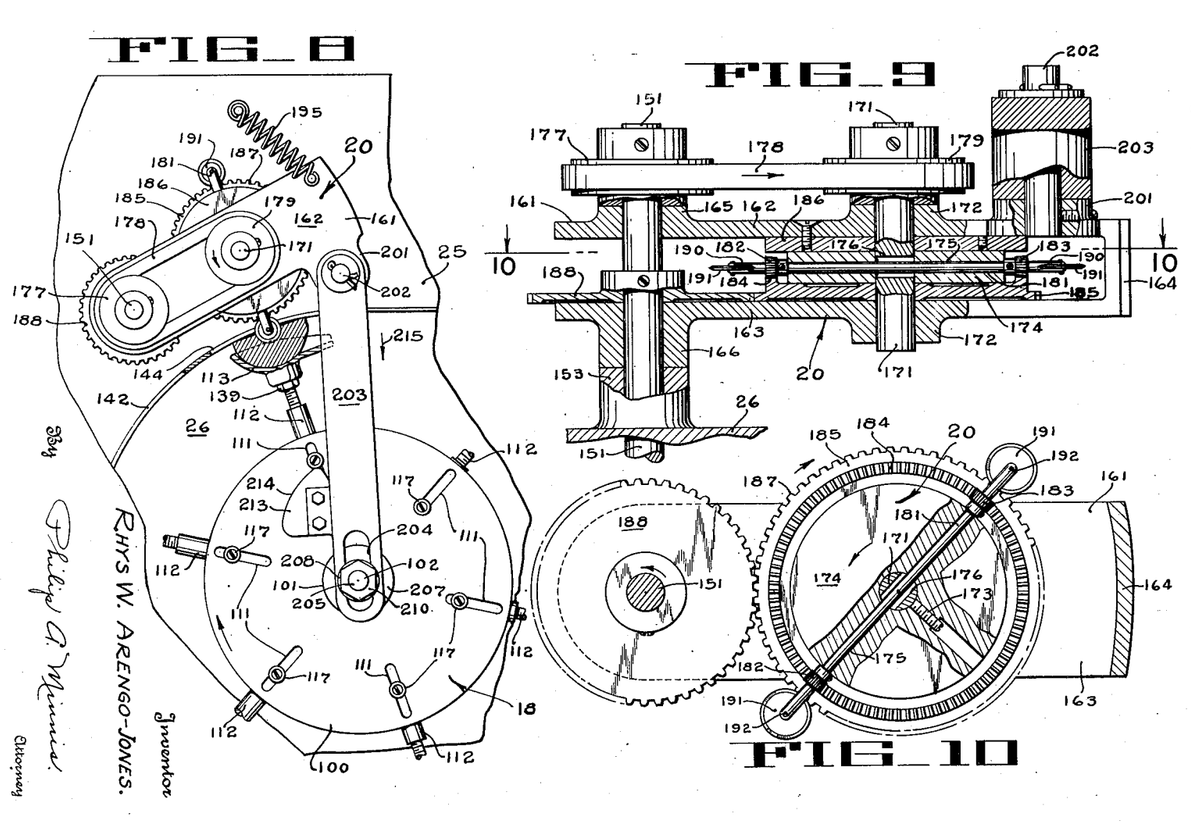
Fig. 8 is an enlarged plan view of a portion of one of the seed celling mechanisms, showing the same in position to cut the seed cell from the fruit, parts being shown in section.
Fig. 9 is an enlarged vertical section taken along the line of 9—9 of Fig. 1.
Fig. 10 is an enlarged horizontal section taken along the line 10—10 of Fig. 9.

As shown in Fig. 9 shaft 151 is rotatably supported by a bearing provided by a boss 153 carried by the top 26 of the frame 25 of the machine. Shaft 152 is likewise rotatably supported from the top 26. The lower end of shaft 151 has a pulley 154 (Fig. 3) fixedly mounted thereon. An endless twisted V-belt 155 is passed around the pulley 154 and a pulley 156 fixedly mounted on the shaft 102 so that rotation of the shaft 151 is opposite to the direction of rotation of the shaft 102, as indicatedd by the arrows, Fig. 3.

As shown in Fig. 3, the lower end of shaft 152 has a pulley 157 fixedly mounted thereon, and an endless twisted V-belt 158 is passed around the pulley 157 and a pulley 159 fixedly mounted on the shaft 103 so that shaft 152 is rotated in a direction opposite to the direction of rotation of shaft 103.

Each seed celling mechanism comprises an elongated U-shaped body 161 having an upper portion 162, a lower portion 163, and an outer end 164 which connects the portion 162, 163. The inner end and sides of the body 161 are open (Figs. 9 and 10). The portions 162, 163 are spaced apart a suitable distance from each other, so as to provide a suitable space therebetween in which the seed celling cutters and associated parts are disposed in the manner to be hereinafter described. The body 161 of the seed celling mechanism 20 is freely rotatable on shaft 151, and said shaft is rotatably mounted in bearings 165, 166 formed in the portions 162, 163 respectively. In a similar manner the seed celling mechanism 21 is freely rotatable on shaft 152 and shaft 152 is rotatably mounted in bearings corresponding to the bearings 165, 166 shown in Fig. 9.

Interposed between the portions 162, 163 of the body 161 and fixedly secured to a shaft 171 rotatably mounted in bearings 172, is an annular disc 174 having an opening 175 formed diametrically therethrough in alignment with an opening 176 formed transversely in the shaft 171. The disc 174 is fixed to the shaft 171 by means of a set screw or similar securing element 173 (Fig. 10).

The shaft 151 is located adjacent the open end of the body 161 and shaft 171 is located intermediate the length of said body. Shaft 151 has fixed thereon for rotation therewith a pulley 177 which is connected by an endless belt 178 to a pulley 179 fixedly secured to shaft 171. The construction is such that rotation of shaft 151 is transmitted by the belt 178 to shaft 171 so that the disc 174 is rotated in the direction of the arrow Fig. 10.

Extending through the aligned openings 175, 176, formed in the disc 174, is an arm or shaft 181 having a pair of beveled gears 182, 183 fixed to the projecting portions thereof adjacent the peripheral wall of the disc 174. The teeth of the gears 182, 183 are in meshing relationship with a ring gear, i. e., teeth 184 formed on the upper face of a gear 185 mounted on the shaft 171 and rotatable independently of said shaft. The gear 185 is disposed between the disc 174 and the upper face of the lower portion 163 of the body 161. The upper face of the disc 174 bears against a circular plate 186 fixed to the upper portion 162 of the body 161, said plate 186 functioning as a filler block between the disc 174 and lower face of the portion 162.

The teeth 187 of the gear 185 are in meshing relationship with the teeth of a gear 188 fixedly mounted on the shaft 151, the construction being such that gear 185 is rotated in an opposite direction to the direction of rotation of the disc 174, as shown by the arrows in Fig. 10.

Each end of the shaft 181 is slotted lengthwise, as indicated at 190 (Fig. 9), for the reception of a knife or cutter 191, said cutter being secured in position in the shaft 181 by means of a pin 192, Fig. 10. The cutter 191 may be in the form of a thin circular disc having its periphery ground to a tapered cutting edge.

During operation of the machine the discs 174 of the seed celling mechanisms 20, 21, are rotated in opposite directions, the disc 174 of the seed celling mechanism 20 being rotated by power supplied from shaft 102 by belt 155, shaft 151, belt 178 and shaft 171, and the disc 174 of the seed celling mechanism 21 being rotated by power supplied from shaft 103 by belt 158, shaft 152, belt 178 and shaft 171 of said seed celling mechanism.

Rotation of the disc 174 imparts a corresponding rotation of the shaft 181 so that first one seed cell cutter 191 moves in proximity to the opening 144 in the plate 142 and then the other seed cell cutter 191 on the shaft 181 moves in proximity to the opening 144. At one point in the movement of a cutter 191 past the opening 144 the longitudinal center line of shaft 181 aligns with the center of one of the cups 113 on the turret 18 also moving past the opening 144 so that the cutter 191 will register substantially with the center of the seed cells of the half fruit carried by said cup.

Due to the fact that the beveled gears 182, 183 are rotating with the disc 174 about an axis provided by the axis of shaft 171 and said gears are in meshing relationship with a ring gear, i. e., the teeth 184 of the gear 185 which is rotated in an opposite direction to the direction of rotation of the disc 174 by gear 188, a rapid rotation of shaft 181 and the cutters 191 mounted thereon is effected about the axis of shaft 181. Thus, during operation of the machine the cutters are bodily rotated about a vertical axis and at the same time said cutters rotate about a horizontal i. e., their own axis.

However, as shown in Fig. 1, the seed celling mechanisms 20, 21 are normally retained by springs 195, in a position in which the cutters 191 are disposed outside of the path of travel of the fruit halves held by the cups 113. In order to move the cutters 191 toward the path of travel of fruit and into seed cell cutting position in timed relation to the movement of the fruit past the opening 144 and to gauge the depth of cut of the seed cell knives 191 in accordance with the size of the fruit halves, the outer end of the body 161 is provided with an ear 201 to which is pivotally attached by means of a pin 202, one end of a link 203. The outer end of the link 203 is formed with an elongated slot 204 through which is inserted the upper threaded end 205 of the shaft 102. Threadedly mounted on the end 205 of shaft 102 (Fig. 7) is a nut 206 which bears against the upper end of the hub 101 of the turret body 100. A washer 207 is interposed between the slotted end of the link 203 and the nut 206 so as to provide means by which the link 203 can move freely. A washer 208 is mounted on the threaded end 205 of the shaft above the slotted end of the link 203, and the nuts 209, 210 are mounted on the end 205 of said shaft so as to prevent accidental displacement of the link therefrom, nut 210 constituting a nut for locking the parts in adjusted position whereby the slotted end of the link is free to move relative to the shaft 102.

Fixedly mounted along one side of the link 203 is a cam 213 having a cam surface 214 (Fig. 8) adapted to be engaged by roller 117 during rotation of the fruit carrying turret 18 toward the seed celling position. The cam surface 214 has a contour by which the link 203 is moved in the direction of the arrow 215 (Fig. 8) and thereby swings the seed cell cutting mechanism about the pivot provided by shaft 151 towards the turret so that a cutter 191 passes through the slot 144 in plate 142 and enters the seed cell of the fruit held by cup 113. Since the cutter 191 is rotating continuously about the axis of shaft 181 in the manner hereinbefore described, the cutter will cut out the seed cell from the fruit half during the period in which the seed celling mechanism is disposed in the seed cell removing position, due to the engagement of the roller 117 with cam surface 214. When the shaft 181 aligns substantially with the longitudinal center line of the cup carrying rod 112, said cutter 191 will be so disposed in the half fruit that all of the seed cell will be completely removed therefrom. Immediately thereafter as the turret carries the roller 117 away from its engagement with the cam surface 214, spring 195 returns the seed celling mechanism as a unit to the position shown in Fig. 1, in which the cutters 191 are out of the path in which the fruit halves are carried by the turret 18. The operation is repeated when the succeeding cup 113 advances the next fruit-half past the other cutter 191. In a similar manner the seed celling mechanism 21 of like construction operates simultaneously to remove the seed cells from the fruit halves carried by turret 19.

The segment cutters 22, 23, each comprise a member 221 which is secured to the outer ends of the plates 142, 143, respectively, as indicated at 222, Figs. 1 and 12. The members 221 and the portions of the plates 142, 143, to which the members are attached are rigidly retained in position on the machine by means of a bracket 223 which is attached to the top 26, as indicated at 224 (Fig. 1).

The body member 221 of each segment cutter is of substantially semi-cylindrical form, being preferably constructed of suitable sheet metal bent to the desired form, and open at both ends. Radially disposed within the semi-circular member 221 are a plurality of thin metal blades 226, Fig. 2. Each of the blades has a portion 227 which extends forwardly from the front end of the segment cutter body, as shown in Fig. 12, the outer edge of the forwardly extending portion 227 of each blade being inclined or being disposed at an angle with respect to the face of each plate 142, 143, as shown in Fig. 1, so that an entrance point is provided for the fruit in advance of the movement of the fruit through the segment cutter body in the manner to be hereinafter described.

In operation, the apples are received from the trimming table where they have been delivered from the paring machine. The operator continuously places apples on the prongs of the feed turret 16 provided by the outwardly projecting portions of the rods 49. The apples are then carried by the feed turret 16 forwardly and downwardly toward a horizontal position. The rotation of the feed turret 16 is so arranged in timed relation to the rotation of the two fruit holding turrets 18, 19, that, as an apple carried by a prong of the feed turret 16 approaches a horizontal position a pair of cups 113, one on each turret 18, 19 respectively, are moving into position to receive the apple. As each apple on the feed turret 16 travels toward substantially horizontal position the pin 51 of the rod 49 on which the apple is mounted, engages the cam surface 55 and the prong is withdrawn from the core opening of the apple whereupon the opposed cups 113, one of each turret 18, 19, engage the apple in the manner shown in Fig. 1.

It is to be noted that the purpose of the open end 140 of each cup 113 is to provide a clear or open channel which will enable unobstructed movement of the cups 113 in a horizontal path past the apple on the feed turret 16 as the cups move into position to receive the apple at the point where the apple is transferred from the feed turret 16 to the holders provided by the opposing cups 113, Fig. 1. During the operation of transferring an apple from the feed turret 16 to a pair of cooperating cups 113, the rollers 116 will be in engagement with the cams 119 so that the cups are retained in suitable spaced relation with respect to each other so as to enable the apple to enter the cavities or pockets of the cups freely, whereupon the rollers 116 pass from the ends of the cams 119 and the springs 114 force the cups 113 outwardly so that the apple is firmly gripped by said cups. The apple will now be nested in the concave seat provided by the spherical surface 136 of each cup, and is held by the two cups 113 in the manner shown in Fig. 1. The pressure exerted by the opposed pair of cups against the apple is not great enough to crush or damage the apple flesh.

It will be noted (Fig. 1) that the cutting edge of the halving knife 17 is substantially in alignment with the axes of the turrets 18, 19. In view of this arrangement of the parts, the cooperating cups of the pair which receive an apple from the feed turret 16 preparatory to introducing the apple to the halving or splitting knife 17, are not diametrically opposite each other when cutting of the apple by the knife commences. However, the apple is firmly nested in the pocket provided by the portions 136 of the cups 113 and the rear wall of each cup functions as means for pushing the apple toward the edge of the knife 17.

The apple is thus divided, one half traveling through the machine snugly pressed by a cup 113 of the turret 18 against the arcuate plate 142, and the other half traveling through the machine snugly pressed by a cup 113 of the turret 19 against the arcuate plate 143. The movement of one half of an apple from the halving knife 17 to the segment cutter 22, corresponds to the movement of the other half of the apple from the halving knife 17 to the segment cutter 23 and both halves of the apple travel at substantially the same rate of speed over the surfaces of the plates 142, 143, respectively. In doing so each half of fruit moves past the openings 144 of said plates so that the seed cell removing operations on each half of the apple are simultaneously performed by the cutters of the seed celling mechanisms 20 and 21, respectively.

After the whole apple has been divided into halves by the knife 17, the roller 116 on the rod 112 on which the cup 113 in which the half of the apple is supported moves out of engagement with the cam surface 118, and, consequently, the cup 113 is extended by spring 114 so that the cut surface of the half of the apple is pressed by the cup with the exposed seed cell side against the surface of the arcuate plate 142 in the manner shown in Fig. 1. In such position the seed cell of the apple will be exposed through opening 144 in the plate 142 when the turret 18 carries the cup 113 past said opening.

Immediately prior to the registration of the half of apple carried by cup 113 with the opening 144 in the arcuate plate 142, the roller 117 moves into engagement with the surface 214 of cam 213 and rides along the same with the result that the seed celling mechanism 20 as a unit is swung inwardly toward the plate 142 in the manner heretofore described so that one of the cutters 191 traveling past the opening 144 in timed relation with the fruit half is introduced through the opening 144 into cutting engagement with the exposed seed cell of the half of fruit.

The timing of the movement of the cutter 191 into seed cell cutting position with the fruit held by a cup 113 of the rotating turret 18 is such that the bodily revolving cutter moves into and out of seed cell cutting position in timed relation to the movement of the fruit past the seed cell cutting position defined by the position of the opening 144 in the plate 142. In this way the operation of removing the seed cell of the apple occurs quickly without the necessity of halting or arresting the rotation of the turret. Consequently the resultant cut-out cavity in the apple is not appreciably elongated.

Due to the rapid manner in which each cutter 191 is rotated about its own axis the seed cell material is removed from the cavity in the apple and drops down the outer surface of the arcuate plate 142. The concave surface of the cavity formed in the fruit by the cutter 191 assists in such action since there are not any surfaces against which the material can lodge. Thus the apple is cleaned of all loose material as it passes from the seed cell removing mechanism.

The contour of cam surface 214 is such that the seed celling mechanism is quickly swung into the seed celling position when a roller 117 engages said cam surface 214 while the cutter 191 performs the necessary cutting action as it travels into and out of cutting engagement with the fruit half to remove the seed cell therefrom. Thereupon as soon as the cutter 191 has moved out of cutting engagement with the fruit half the roller 117 runs off the cam surface 214 and the spring 195 returns the seed celling mechanism to its normal inoperative position. It is to be understood that during the operation of the parts associated with turret 18 to remove the seed cells from the halves of apples carried by the cups 113 of said turret, a simultaneous operation is being performed on the halves of apples carried by the cups 113 of the turret 19.

The size of the fruit handled by the machine may vary so that halves of fruit of different thickness may be presented to the seed celling mechanism. Likewise the shape of the fruit may vary so that the fruit presented by cooperating fruit holders 113 to the halving knife 17 may be unevenly halved by said knife whereby halves of different thickness are obtained. Therefore, since the cups 113 are resiliently mounted their proximity relative to the plates 142 and 143 during movement therealong is determined by the thickness of the half of the apple held therein. It is therefore apparent that when a cup holds a small half of an apple said cup will be disposed closer to the inner surface of the plate adjacent thereof than when a relatively large half of fruit is carried thereby. Consequently, the roller 117 on supporting rod 112 of said cup will be disposed in different radial positions relative to its turret and will therefore engage the cam surface 214 of the cam 213 at different points depending upon the thickness of the half of fruit.

In view of this, the cam 213 and arm 203 will be shifted by the roller 117 in the direction of arrow 215 to a greater or lesser extent and the seed celling mechanism will be swung inwardly toward the fruit holding turret more or less depending upon the thickness of the fruit halves whereby the depth of cut of the seed cell knife is automatically gauged in accordance with the thickness of the fruit. Since the size of the seed cell varies in proportion to the size of the fruit the seed cell of each half of fruit is proportionate to the thickness of each half of fruit. It is therefore apparent that by gauging the depth of cut of the seed celling knife according to the thickness of each fruit half handled by the machine a perfect seed celling of each fruit half is obtained and insufficient or excessive depth of cut of the seed celling knives is prevented.

The segmenting operation is a matter of forcing the cored apple through the dividing sections provided by the series of radially disposed blades 226. The cup 113 carries each cored piece of apple toward the projecting tapered portions 227 of the blades and forces the apple into the blades a sufficient distance so that the apple will be supported by the blades and will be retained thereon as the cup 113 moves away from the apple. The succeeding apple forces the foremost apple still farther through the segment cutter and in this manner the apples are divided into separate segments as they emerge from the discharge end of the segment cutter, the member 221 providing a shroud for holding the segments in position. From the segment cutter 22, 23 the pieces of apples can be conveyed by suitable means (not shown) to other apparatus for further processing.

While I have described a particular embodiment of the present invention, it will be obvious that various changes and modifications may be made in the details thereof without departing from the spirit of the present invention and the scope of the appended claim.

Having thus described my invention, what I claim and desire to protect by Letters Patent is:

A seed celling machine for fruit such as apples comprising an arcuate apertured plate, a turret provided with fruit holders for receiving halves of fruit and for advancing them along said plate, means for yieldingly urging said holders toward said plate to hold the halves of fruit with the exposed seed cell side thereof against said plate, the yielding of the holders being controlled by the size of fruit half held therein, a rotatable seed cell knife with a blade edge disposed radially of its axis of rotation, means for simultaneously rotating and moving said seed cell knife through the aperture of said plate into cutting engagement with the seed cells of fruit halves during their advancement along said plate, means for rotating the seed cell knife about its own axis during its movement into engagement with the halves of fruit to cut up the seed cells thereof and to sweep out the seed cell material, and gauging means operatively interconnecting the fruit holders and the seed cell knife and responsive to the yielding position of the fruit holders relative to said plate for gauging the depth of cut of the seed cell knife in accordance with the size of the halves of fruit held thereby.

R. W. ARENGO-JONES.

REFERENCES CITED

The following references are of record in the file of this patent:

UNITED STATES PATENTS

| Number | Name | Date |
|---|---|---|
| 445,753 | Ish | Feb. 3, 1891 |
| 1,034,037 | Smith | July 30, 1912 |
| 1,386,552 | Carney | Aug. 2, 1921 |
| 1,484,446 | Felizianetti | Feb. 19, 1924 |
| 1,506,679 | Smith | Aug. 26, 1924 |
| 1,512,410 | Eldridge | Oct. 21, 1924 |
| 1,785,014 | Norgaard | Dec. 16, 1930 |
| 1,825,470 | Musselman | Sept. 29, 1931 |
| 1,861,084 | Goranson et al. | May 31, 1932 |
| 1,901,042 | Robbins | Mar. 14, 1933 |
| 1,982,779 | Ayars | Dec. 4, 1934 |
| 1,994,473 | Jones | Mar. 19, 1935 |
| 2,226,664 | Jepson | Dec. 31, 1940 |
| 2,231,002 | Ewald | Feb. 11, 1941 |
| 2,242,241 | Ewald | May 20, 1941 |
| 2,282,326 | Ewald | May 12, 1942 |
| 2,332,177 | Smith | Oct. 19, 1943 |
| 2,353,841 | McKinnis | July 18, 1944 |
| 2,380,530 | Jepson | July 31, 1945 |

FOREIGN PATENTS

| Number | Country | Date |
|---|---|---|
| 243,219 | Great Britain | Nov. 26, 1925 |